Sept. 10, 1940.   P. C. A. M. D'AUBAREDE   2,214,293

UNIVERSAL JOINT

Filed Jan. 13, 1938

INVENTOR:—
Paul Charles Albert Marie d'Aubarede

By
ATTORNEYS

Patented Sept. 10, 1940

2,214,293

UNITED STATES PATENT OFFICE 2,214,293

UNIVERSAL JOINT

Paul Charles Albert Marie d'Aubarede, Saint-Genis-Laval, France

Application January 13, 1938, Serial No. 184,858
In France January 14, 1937

2 Claims. (Cl. 180—73)

This invention relates to transmissions embodying universal joints and in which the shafts or shafting must be able to vary in length.

In such transmissions each shaft must comprise one or two universal joints and appropriate axially slidable joints.

For instance in automobile engines elastically mounted on the frame or chassis, the transmission must account for the motions of the wheels with respect to the chassis and also for the oscillations of the engine assembly. It is necessary that the transmission between the engine and the wheels should not hinder these oscillations.

The slidable joints generally used require a considerable force to be operated when they transmit a relatively high torque. The motions of the wheels with respect to the chassis take place nevertheless because the forces set up here are considerable, but the engine is not free to oscillate about its natural oscillation axes and the stresses are transmitted to the chassis.

A first object of my invention is a transmission which will always permit the engine to oscillate freely or substantially so on its elastic mounting.

A further object of my invention is a universal joint comprising an elastic member allowing an axial displacement of the shafts connected by the joint.

Still a further object of my invention is to provide a transmission comprising in combination axially slidable joints and universal joints provided with elastic members, the said transmission permitting the large variations in length resulting for instance from the relative motions of the wheels in an automobile, and also the small variations in length resulting from the oscillations of the engine assembly with respect to the frame or chassis.

Figure 1:
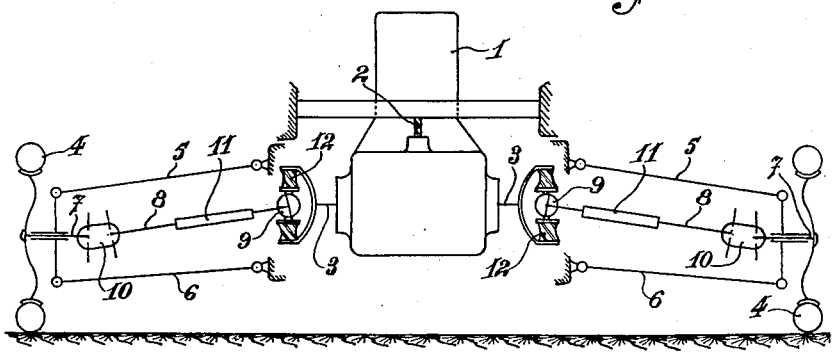
Fig. 1 is a diagrammatical view of a front wheel drive for automobiles, the engine assembly being elastically mounted on the frame.

In Fig. 1 an engine 1 is elastically mounted on its chassis by means of a flexible connection 2 and of springs not shown, this mounting being for instance of the type claimed in my prior Patent No. 2,084,080. The engine 1 comprises an appropriate gear box and it drives lateral driving shafts 3 which drive the front wheels 4.

Wheels 4 are supported by arms 5 and 6 articulated to the frame and to the wheel bearings.

The drive is transmitted from shafts 3 to shafts 7 by means of intermediate shafts 8 coupled to shafts 3 by means of universal joints 9 and to shafts 7 by means of homokinetic joints 10. It is well-known that a homokinetic joint is a double universal joint so devised that the angular speed of the driven side is always equal to the angular speed of the driving side notwithstanding the angle of the axes of both sides, whereas in a simple universal joint of the Cardan type the speed of the driven side is irregular as soon as the angle of the axes of both sides becomes large. Furthermore the intermediate shafts 8 are provided with axially slidable joints 11 generally comprising a grooved sleeve housing a toothed sliding head.

Joints 11 normally permit the engine to oscillate more or less freely about connection 2, but in practice, when the torque transmitted is high, joints 11 require a very high force for being operated axially and they hinder the oscillations of engine 1.

According to this invention joints 9 are carried by an elastic member permitting a certain amount of axial freedom. In the example shown in Fig. 1 the elastic member is formed of a rubber ring 12 inserted between the two metallic cylinders, the said ring permitting an axial displacement sufficient to account for the free oscillations of engine 1 about connection 2.

For instance the elastic member will permit under the action of a moderate stress, an axial displacement of several millimetres of joints 9 with respect to engine 1. The latter is thus free to oscillate freely about connection 2 without applying periodic stresses or vibrations to the chassis through shafts 8. The elastic member will generally be unable to permit the large axial displacements resulting from the vertical motions of wheels 4 with respect to the frame, but these displacements are dealt with by sleeves 11.

Figure 2:
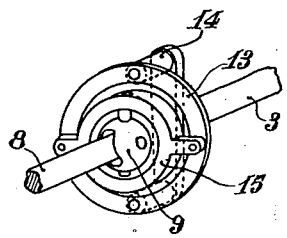
Fig. 2 shows a modified construction of the improved universal joint.

In lieu of a rubber ring the elastic member could be formed, as shown in Fig. 2, of a number of flexible discs 13 interposed between a fork 14 carried by the driving shaft 3 and a member 15 which carries the articulated joint 9.

Figure 3:
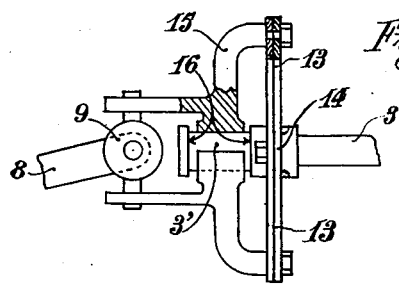
Fig. 3 shows a further modification.

It is possible to guide member 15, as shown in Fig. 3 in which shaft 3 carries an extension 3′ on which member 15 is slidably mounted, the axial freedom being limited by abutments 16 in order to avoid too high stresses being applied to members 13 when the vertical motions of wheels 4 cause large variations in length of the transmission.

Of course the abutments could be provided on both sides of discs 13.

Instead of flexible discs, generally made of fabrics, leather, etc., there could be used metallic blades, for instance made of spring steel.

It will be observed that the rubber ring 12 has the advantage of forming an elastic coupling able to provide a certain amount of torsional elasticity. This coupling may be so devised as to fulfill the arresting filter condition described in my co-pending application No. 132,151, filed March 20, 1937.

The elastic member could also be associated with the homokinetic joints 10 or with the slidable joints 11.

In some constructions it is possible to provide for the wheels 4 a circular path concentric with the corresponding universal joint 9. In such a case the motions of the wheels with respect to the frame cause no variation in the length of the transmission shafts and joints 11 may be dispensed with.

The invention is besides not limited to the case of the drive of automobile wheels, but it may be applied in any case in which the same problem is to be solved.

I claim:

1. In a vehicle having a chassis and having driving wheels and having an elastically mounted engine assembly longitudinally disposed with respect to the chassis and oscillatable thereon about a substantially longitudinal oscillation axis under the action of periodic torques; substantialy transverse driving shafts connecting said engine assembly with said driving wheels, each of said driving shafts including universal joints at both ends; slidable joints in said shafts adapted to accommodate large variations in length resulting from vertical movements of the wheels with respect to the chassis; and axially elastic joints interposed in said shafts to accommodate small variations in length resulting from oscillations of said engine assembly on its elastic mounting under the action of periodic torques.

2. In a vehicle having a chassis and having driving wheels and having an elastically mounted engine assembly longitudinally disposed with respect to the chassis and oscillatable thereon about a substantially longitudinal oscillation axis under the action of periodic torques; substantially transverse driving shafts connecting said engine assembly with said driving wheels, each of said driving shafts having universal joints at both ends; slidable joints in said shafts adapted to accommodate large variation in length resulting from vertical movements of the wheels with respect to the chassis; axially elastic joints in said shafts to accommodate small variations in length resulting from oscillations of said engine assembly on its elastic mounting under the action of periodic torques; and means in said joints for limiting axial deformation thereof.

PAUL CHARLES ALBERT
MARIE D'AUBAREDE.